(12) United States Patent
Srinivas et al.

(10) Patent No.: US 8,386,286 B2
(45) Date of Patent: Feb. 26, 2013

(54) SYSTEM AND METHOD FOR THE DYNAMIC ALLOCATION OF RESOURCES

(75) Inventors: Sharath Srinivas, Webster, NY (US); Rakesh Kulkarni, Webster, NY (US); Sudhendu Rai, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/116,893

(22) Filed: May 26, 2011

(65) Prior Publication Data
US 2012/0303406 A1    Nov. 29, 2012

(51) Int. Cl.
*G06Q 40/00*    (2012.01)
(52) U.S. Cl. ...................................... 705/7.11; 705/7.42
(58) Field of Classification Search .............. 705/7, 7.11, 705/7.42
See application file for complete search history.

(56) References Cited

U.S. PATENT DOCUMENTS

| 6,877,035 B2 | 4/2005 | Shahabuddin et al. ....... 709/226 |
| 7,079,266 B1 | 7/2006 | Rai et al. ...................... 358/1.13 |
| 7,286,889 B1 | 10/2007 | Orzell et al. ................... 700/101 |
| 7,515,983 B2 | 4/2009 | Orzell et al. ................... 700/101 |
| 7,562,002 B2 * | 7/2009 | Rzevski et al. ................. 703/22 |
| 2006/0020565 A1 * | 1/2006 | Rzevski et al. ................. 706/50 |
| 2007/0091355 A1 | 4/2007 | Rai .............................. 358/1.15 |
| 2009/0327190 A1 * | 12/2009 | Rzevski et al. ................. 706/46 |

* cited by examiner

*Primary Examiner* — Thomas Dixon
*Assistant Examiner* — Benjamin S Fields
(74) *Attorney, Agent, or Firm* — Kermit D. Lopez; Luis M. Ortiz; Ortiz & Lopez, PLLC

(57) ABSTRACT

A system and method for dynamically allocating resources in a process. A demand pattern change detection unit, a future demand forecasting unit and a process optimization engine can be employed to constantly adjust resource allocation and assist in maintaining processes in a state of peak performance. An initial resource allocation unit generates an initial resource allocation plan based on past experience with respect to the process. The change detection unit detects a shift in the job demand pattern utilizing a statistical data when a change occurs in process requirements. The future demand generation unit accurately generates future demand data based on current job data and the outlook of future demand. The optimization engine acts as a surrogate process expert and provides recommendations to the process owner regarding potential possible resource allocation policies for new job demand data utilizing a simulation process to predict the result of variable staffing configurations.

20 Claims, 13 Drawing Sheets

```
1. BEGIN WITH INITIAL PLAN P
2. GET AN INITIAL TEMPERATURE T>0
3. WHILE NOT YET FROZEN (I.E. T>0) DO THE FOLLOWING
        3.1. PICK A RANDOM NEIGHBOR P¹ of P
        3.2. LET Δ = COST (P') – COST(P)
        3.3. IF Δ < 0 (DOWNHILL MOVE)
        3.4. IF Δ > 0 (UPHILL MOVE)
                    SET P = P' WITH PROBABILITY $e^{-\Delta/2}$
        3.5.        SET T= rT (REDUCE TEMPERATURE)
4. RETURN P
```

SYSTEM AND METHOD FOR THE DYNAMIC ALLOCATION OF RESOURCES

TECHNICAL FIELD

Embodiments are generally related to process management systems and methods. Embodiments are also related to resource allocation systems and methods. Embodiments are additionally related to the reallocation of resources in the context of print shops and other transactional job environments.

BACKGROUND OF THE INVENTION

Project management involves the planning, organizing, securing and managing of resources in order to successfully complete specific project goals and objectives. In project management, resource allocation typically includes the scheduling of activities and the resources required by such activities while taking into consideration both the resource availability and the project time. The decisions to allocate resources to a particular cell or department, for example, may be made during the design stage or in some cases during an intermediate process improvement initiative. The resources allocated at that stage are optimum considering the information available at that time.

The demand patterns, however, may undergo permanent or seasonal variations in demand during the life cycle of a process, due to changes in, for example, customer and user requirements. Additionally, there can also be changes in the execution speed of particular processes as process operators become more proficient at their tasks or begin performing new types of tasks. As a consequence, the process moves into a state of sub-optimal performance. Such changes can render the initial resource allocation sub-optimal, which will result in below-par performance of the processes. The actual number of resources required may be higher or lower than the initially allocated number.

FIG. 1 illustrates a graph 100 that plots data indicative of a job demand between example departments 101, 102 and 106 in a process. As shown in FIG. 1, departments 101, 102 and 106 began with roughly a similar amount of demand. In the scenario outlined in FIG. 1, however, a violations processing department 103 experienced a permanent downturn in demand. As a result in this particular scenario, a tag processing department 101 encountered a consistent increase in demand while a general correspondence department 102 encountered a seasonal reduction in demand around week four, which then lasted for the duration of the next four weeks.

FIG. 2 illustrates a graph 150 depicting the impact of the variation in job demand with respect to employee utilization. Continuing with the scenario depicted in FIG. 1, the impact of the variation in job demand with respect to employee utilization is indicated by the data of graph 150. The utilization of employees in the tag processing department 101 increased because of the increase in the demand and at the same time the utilization of employees in violations processing 103 reduced significantly. Though the process owners can re-evaluate and reconfigure the process to reach its peak performance, because of the speed and the recurrence of changes, the reevaluation has to be done quite frequently. Additionally, process re-evaluation is a manual and data intensive activity and is very expensive to perform. Thus, most processes are not able to quickly adapt to the changes and such processes run at a sub-optimal performance level a majority of the time.

Based on the foregoing, it is believed that a need exists for an improved dynamic resource allocation system and method for dynamically allocating resources between departments in a business or organizational process, such as, for example printshop environments or other transactional job environments, as will be described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved process management systems and methods.

It is another aspect of the disclosed embodiments to provide for an improved system and method for dynamically allocating resources between departments organizations in a process.

It is a further aspect of the disclosed embodiment to provide for an improved simulation based optimization engine for reallocating resources.

The aforementioned aspects and other objectives and advantages can now be achieved as described herein. A system and method for dynamically allocating resources between departments in a process (e.g., a business process, print shop, etc) is disclosed herein. A demand pattern change detection unit can be configured in association with a future demand forecasting unit and a process optimization engine that constantly adjusts resource allocation and assists in maintaining processes in a state of peak performance. An initial resource allocation unit generates an initial resource allocation plan based on past experience with respect to the process. The change detection unit detects a shift in the job demand pattern utilizing statistical data (e.g., a statistical process chart) when a change occurs in process requirements (e.g., business, market, or organization requirements, etc). The future demand generation unit accurately generates a future demand data based on a current job data and an outlook of the future demand. The optimization engine acts as a surrogate process expert and provides recommendations to the process owner regarding the potential possible resource allocation policy for the new job demand data utilizing a simulation process to predict the results of different staffing configurations.

A process owner can bootstrap the process based on the initial resource allocation plan. A current demand pattern can be continuously monitored by the change detection unit to detect subtle shifts in the demand patterns. A message can be presented to the process owner when the statistical process chart detects the change in the demand pattern. If the change in the demand pattern is a false positive then the message can be ignored. The information from the statistical process chart can be validated and the changed demand profiles can be supplied as input to the demand data generation unit if a true shift in the demand pattern is detected. The demand generation unit considers the current job data and the outlook of the future demand to produce a synthetic customer demand data that preserves the characteristics of the historical demand patterns and adjusts an expected change in a market condition.

The optimization engine includes a heuristics based solution explorer and a discrete event simulator (DES). The heuristic explorer explores new resource allocation plans and converges to a "potential" possible plan based on a simulated annealing process. The quality of a plan (cost) is based on the cost returned by the discrete event simulator. The discrete event simulator performs a simulation for each new plan returned by the heuristic explorer and determines the cost of the plan. Such an approach performs process re-evaluation frequently and automatically provides a recommendation to dynamically reallocate the resources to the process owner.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
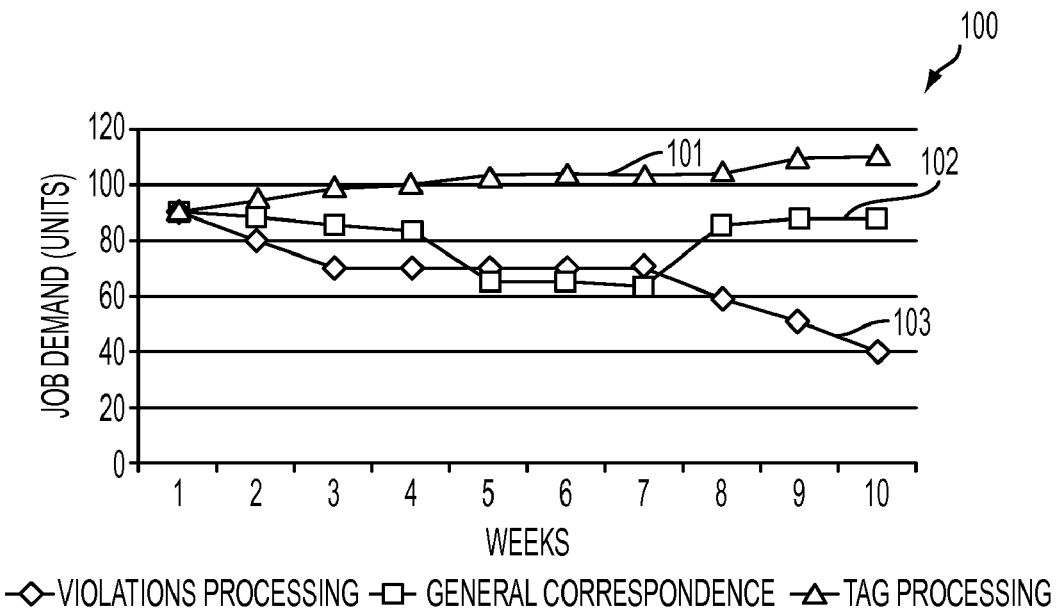
FIG. 1 illustrates a graphical representation illustrating a job demand between departments in a process.
Figure 2:
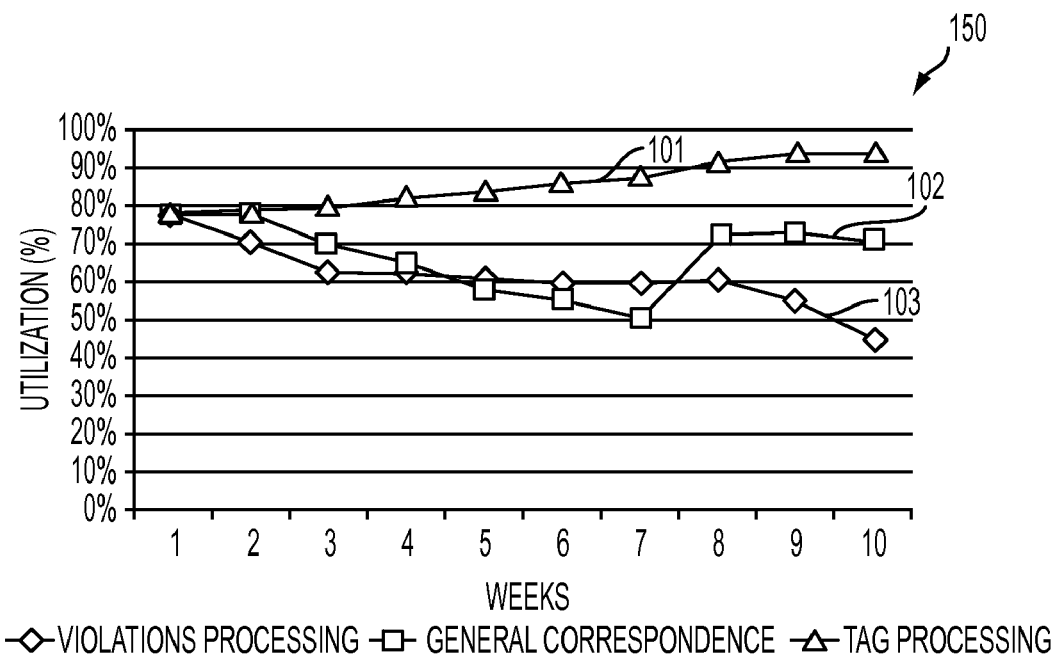
FIG. 2 illustrates a graph depicting the impact of the variation in the job demand with respect to employee utilization.

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one of skill in the art, the present invention can be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.) The computer program code, however, for carrying out operations of the present invention may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 3:
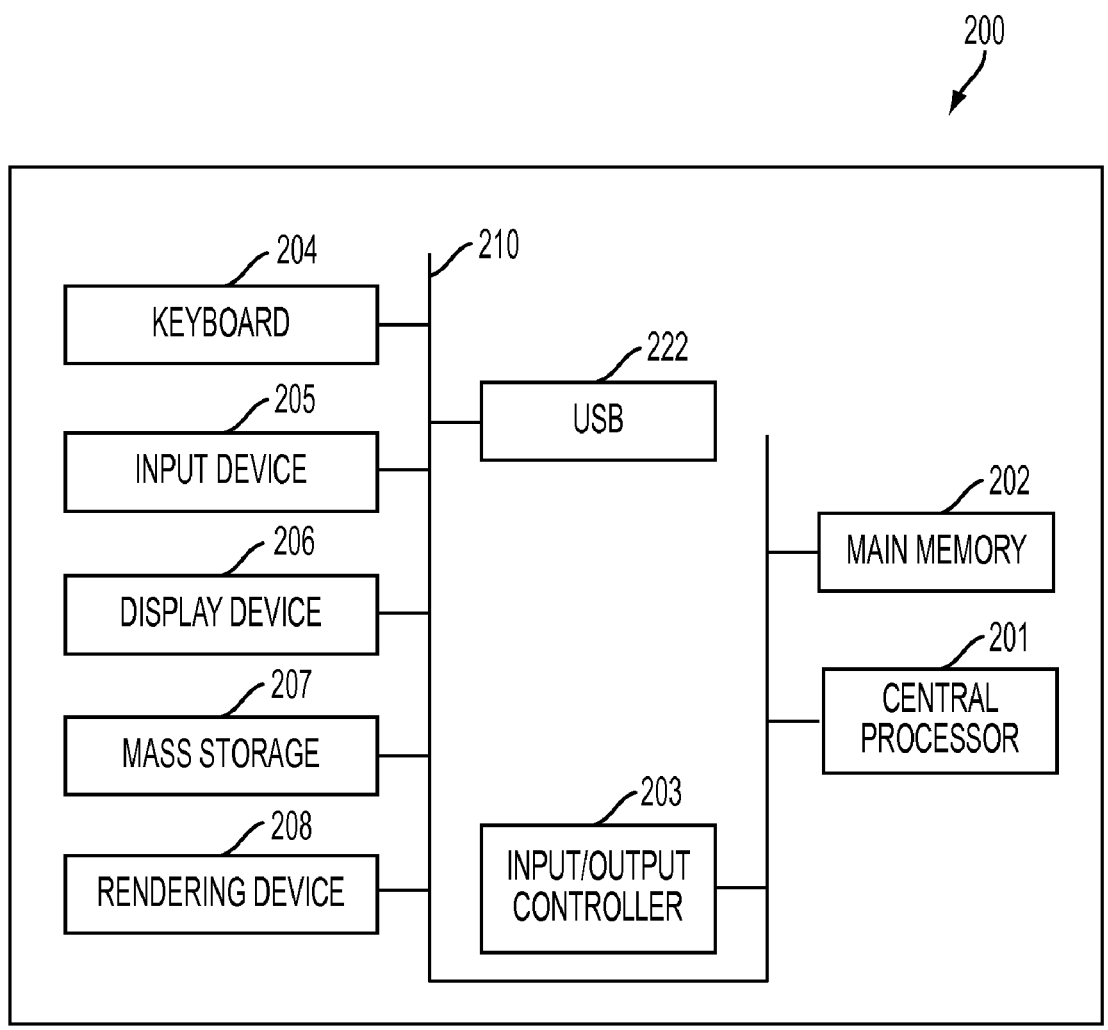
FIG. 3 illustrates a schematic view of a computer system, in accordance with the disclosed embodiments.
Figure 4:
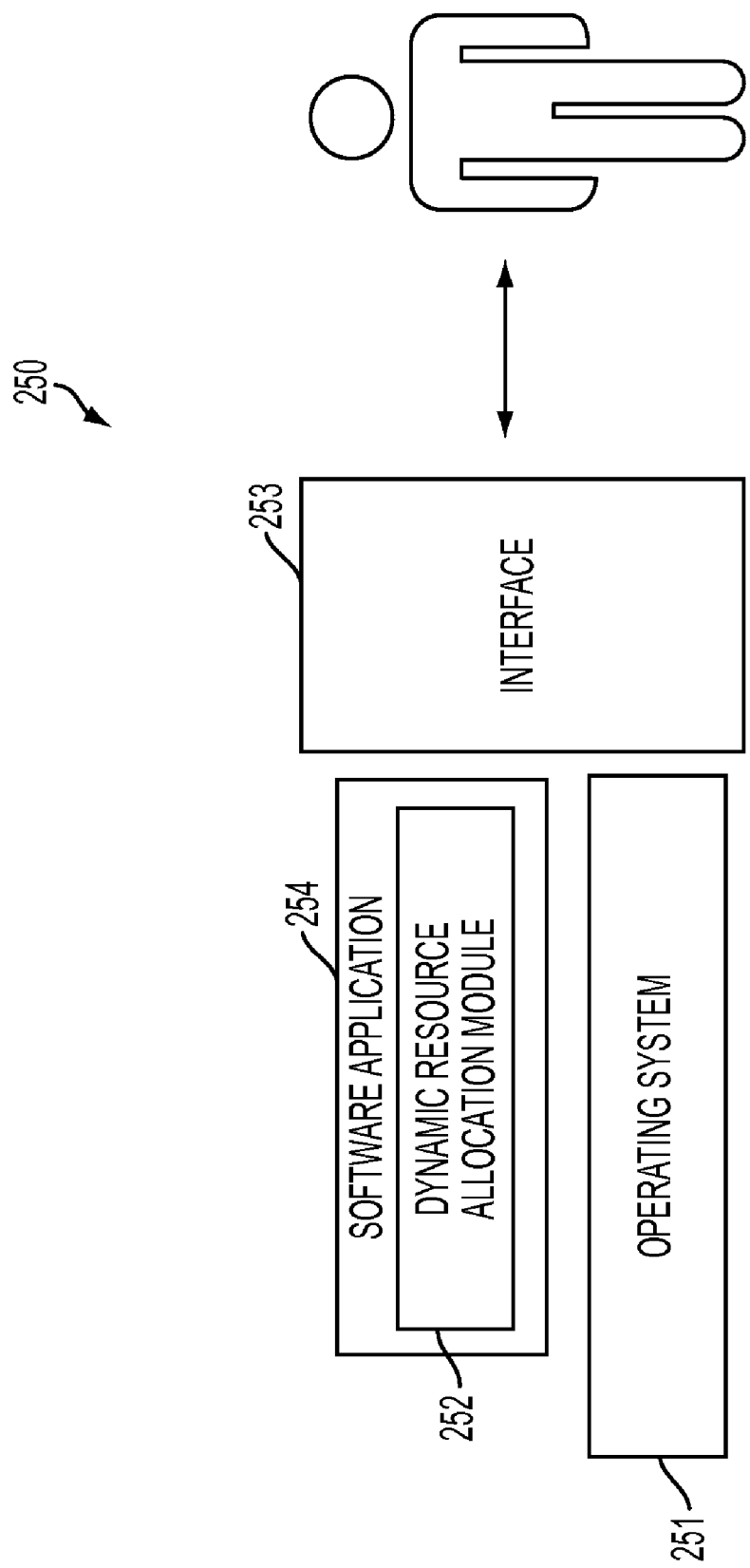
FIG. 4 illustrates a schematic view of a software system including a dynamic resource allocation module, an operating system, and a user interface, in accordance with the disclosed embodiments.

FIGS. 3-4 are provided as exemplary diagrams of data-processing environments in which embodiments of the present invention may be implemented. It should be appreciated that FIGS. 3-4 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 3, the disclosed embodiments may be implemented in the context of a data-processing system 200 that includes, for example, a central processor 201, a main memory 202, an input/output controller 203, a keyboard 204, an input device 205 (e.g., a pointing device, such as a mouse, track ball, pen device, etc), a display device 206, a mass storage 207 (e.g., a hard disk), and a USB (Universal Serial Bus) peripheral connection 222. Additional input/output devices, such as a near infrared (NIR) video capturing unit 208 (e.g., video camera, etc.), for example, may be associated with the data-processing system 300 as desired. As illustrated, the various components of data-processing system 300 can communicate electronically through a system bus 210 or similar architecture. The system bus 210 may be, for example, a subsystem that transfers data between, for example, computer components within data-processing system 300 or to and from other data-processing devices, components, computers, etc.

FIG. 4 illustrates a computer software system 350 for directing the operation of the data-processing system 300 depicted in FIG. 3. Software application 254, stored in main memory 202 and on mass storage 207, generally includes a kernel or operating system 251 and a shell or interface 253. One or more application programs, such as software application 254, may be "loaded" (i.e., transferred from mass storage 207 into the main memory 202) for execution by the data-processing system 300. The data-processing system 300 receives user commands and data through user interface 253; these inputs may then be acted upon by the data-processing system 300 in accordance with instructions from operating system module 251 and/or software application 254.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

The interface 253, which is preferably a graphical user interface (GUI), can serve to display results, whereupon a user may supply additional inputs or terminate a particular session. In some embodiments, operating system 251 and interface 253 can be implemented in the context of a "Windows" system. It can be appreciated, of course, that other types of systems are potential. For example, rather than a traditional "Windows" system, other operation systems, such as, for example, a Real Time Operating System (RTOS) more commonly employed in wireless systems may also be employed with respect to operating system 251 and interface 253. The software application 254 can include, for example, a dynamic resource allocation module 252 for allocating resources between departments in, for example, a business process. The dynamic resource allocation module 252 can include instructions, such as those of method 400 discussed herein with respect to FIG. 6.

FIGS. 3-4 are thus intended as examples, and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Figure 5:
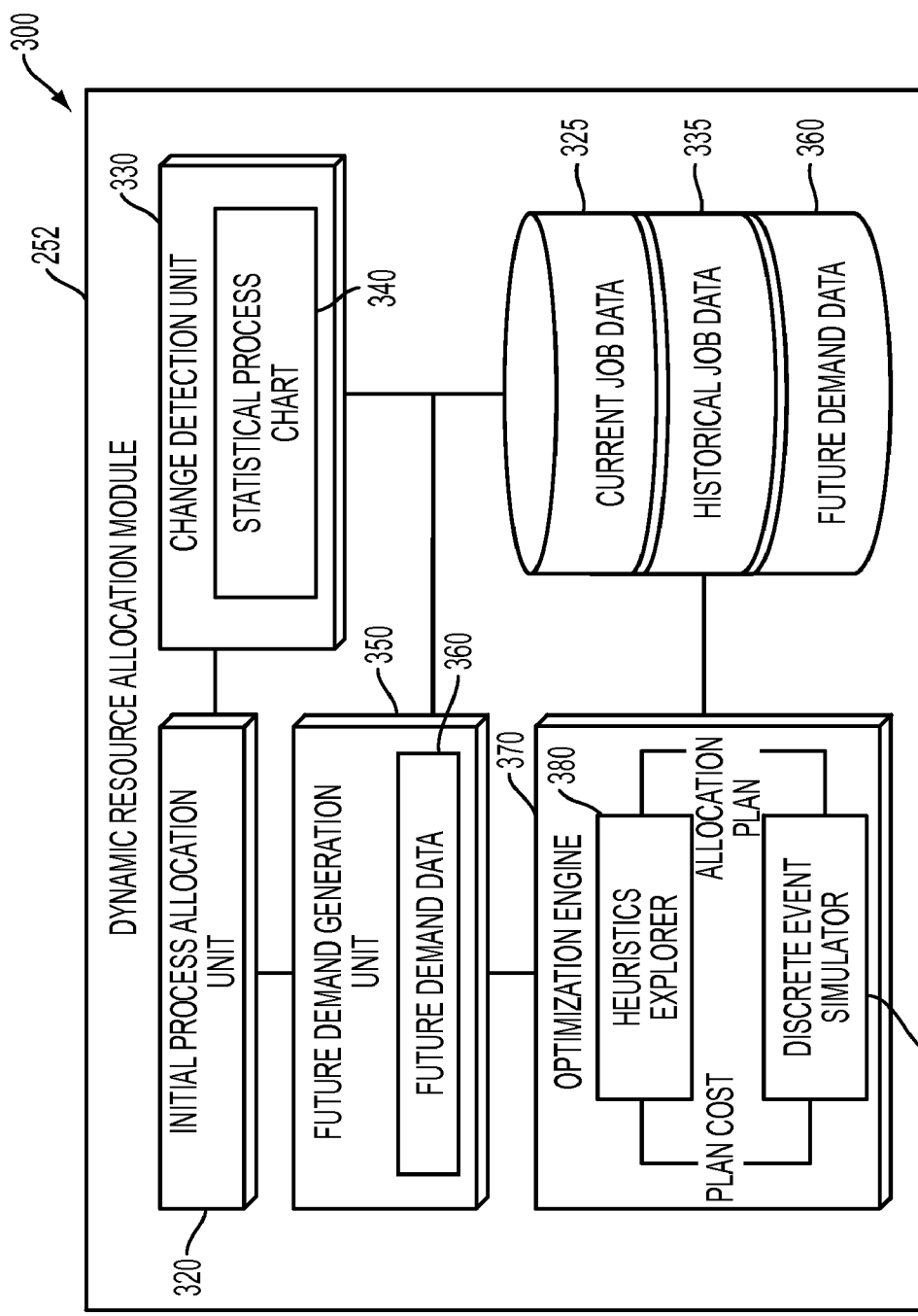
FIG. 5 illustrates a block diagram of a dynamic resource allocation system, in accordance with the disclosed embodiments.

FIG. 5 illustrates a block diagram of a dynamic resource allocation system 300, in accordance with the disclosed embodiments. Note that in FIGS. 1-16, identical or similar blocks are generally indicated by identical reference numerals. The dynamic resource allocation system 300 can be configured to include the dynamic resource allocation module 252 to constantly adjust the resource allocation and assist in maintaining the processes in a state of peak performance. The dynamic resource allocation module 252 further includes a demand pattern change detection unit 330, a future demand forecasting unit 350 and a process optimization engine 370. An initial resource allocation unit 320 generates an initial resource allocation plan based on a past experience with respect to the process. Examples of such a "process" include environments such as a business process, a print shop environment, and so forth. A process owner can bootstrap the process based on the initial resource allocation plan.

The change detection unit 330 detects a shift in the job demand pattern utilizing a statistical process chart 340 when a change occurs in a business requirement. A current demand pattern can be continuously monitored by the change detection unit 330 to detect subtle shifts in the demand patterns. In general, statistical process control is the application of statistical methods to the monitoring and control of a process to ensure that it operates at its full potential to produce conforming product. Under SPC, a process behaves predictably to produce as much conforming product as possible with the least possible waste. While SPC has been applied most frequently to controlling manufacturing lines, it applies equally well to any process with a measurable output. Key tools in SPC are control charts, a focus on continuous improvement and designed experiments.

A message can be presented to the process owner when the statistical process chart 340 detects the change in the demand pattern. The detected changes of the demand pattern can be presented as input to the future demand data generation unit 350 in order to generate a future demand data 360. The future demand generation unit 350 accurately generates the future demand data 360 based on a current job data 325 and an outlook of the future demand. The optimization engine 370 acts as a surrogate process expert and provides recommendations to the process owner regarding the best possible resource allocation policy for the new job demand data utilizing a simulation process to predict the results of different staffing configurations.

The optimization engine 370 can be configured to include a heuristics based solution explorer 380 and a discrete event simulator (DES) 390. It can be appreciated that the optimization engine 370, the solution explorer and the DES 390 can be implemented as software modules. The heuristic explorer 380 explores a new resource allocation plans and converges to the "best" or optimal possible plan based on a simulated annealing process. The "quality of a plan (cost) can be based on the cost returned by the discrete event simulator 390. The discrete event simulator 390 performs a simulation for each new plan returned by the heuristic explorer 380 and determines the cost of the plan. In discrete-event simulation, the operation of a system is represented as a chronological sequence of events.

Each event occurs at an instant in time and marks a change of state in the system. The discrete event simulator 390 can be a label distribution protocol (LDP) DES 390. The LDP is a protocol in which two Label Edge Routers (LER) exchange label mapping information. The resource allocation can be processed utilizing an optimization technique based on a simulated annealing algorithm in order to explore the solution space and determine a best possible operator allocation policy for the new job demand data. Such an approach performs process re-evaluation frequently and automatically provides a recommendation to dynamically reallocate the resources to the process owner.

Figure 6:
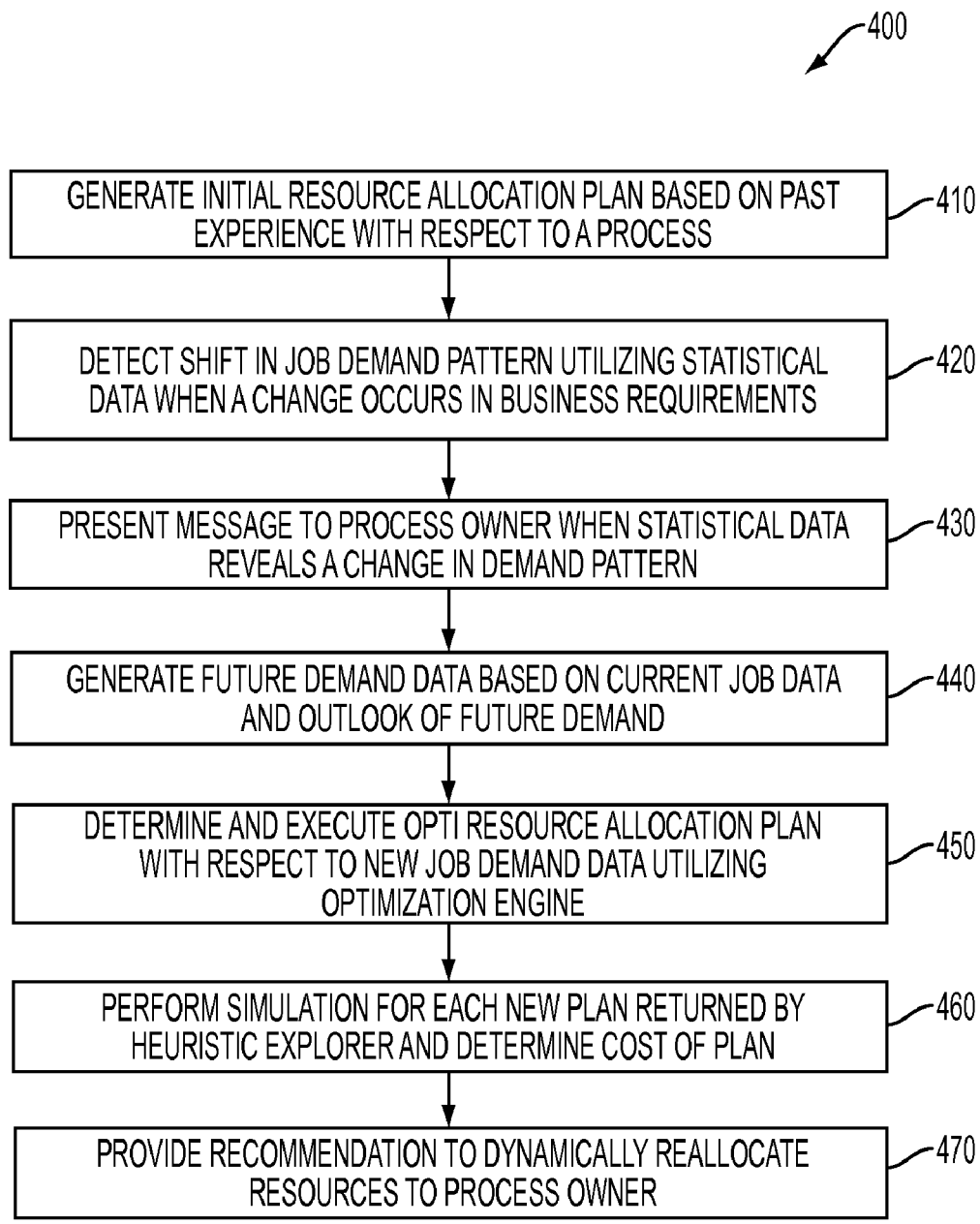
FIG. 6 illustrates a high level flow chart of operation illustrating logical operational steps of a method for dynamically allocating resources between departments in a process, in accordance with the disclosed embodiments.

FIG. 6 illustrates a high level flow chart of operations illustrating logical operational steps of a method 400 for dynamically allocating resources between departments in a process, in accordance with the disclosed embodiments. It can be appreciated that the logical operational steps shown in FIG. 6 can be implemented or provided via, for example, a module such as module 252 shown in FIG. 4 and can be processed via a processor, such as, for example, the processor 201 shown in FIG. 1.

As indicated at block 410, an initial resource allocation plan can be generated based on past experience with respect to a particular process. An example of a "process" in this context could be a business process. Thereafter, as illustrated at block 420, an operation can be implemented to detect a shift in a job demand pattern utilizing statistical data such as, for example, data provided via a statistical process chart, when a change occurs in particular requirements (e.g., business requirements). Next, as indicated at block 430, one or more messages can be presented to the owner of the process (i.e., the "process owner") when the statistical data (e.g., statistical process chart) reveals a change in the demand pattern. Following processing of the operation depicted at block 430, future demand data can be generated based on current job data and the outlook of future demand, as shown at block 440. Next, as indicated at block 450, an operation can be implemented to detect and execute the optimal resource allocation plan with respect to new job demand data utilizing, for example, the optimization engine 370. Thereafter, a simulation can be performed for each new plan returned by the heuristic explorer 380 and the cost of each plan determined, as illustrated at block 460. Finally, as described at block 470, a recommendation can be provided to dynamically reallocate resources to the process owner.

Figure 7:
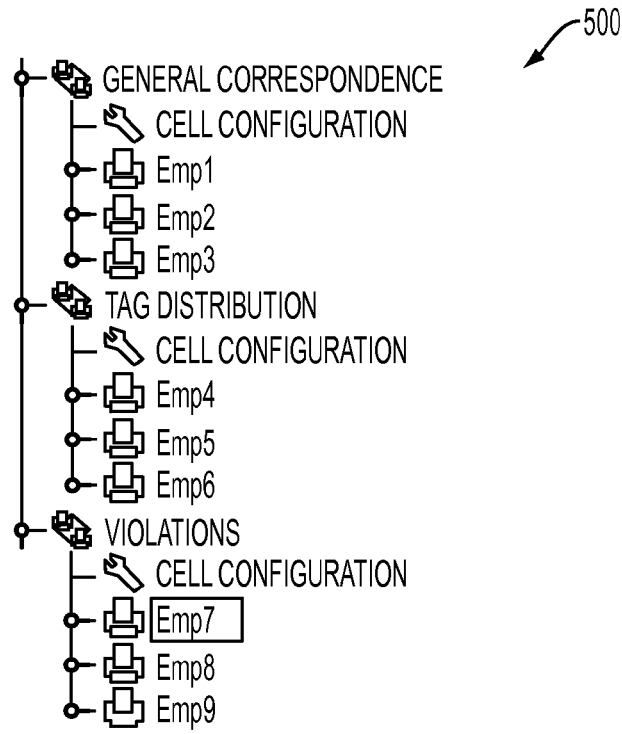
FIG. 7 illustrates GUI illustrating of an initial resource allocation plan, in accordance with the disclosed embodiments.

FIG. 7 illustrates a diagram of a GUI 500 that can be utilized for implementing an initial resource allocation plan, in accordance with the disclosed embodiments. In general, resources can be allocated to a business process based on the initial resource allocation plan with assistance of a process owner. The process owner distributes nine employees equally among the three departments, as shown in FIG. 7.

Figures 9, 10:
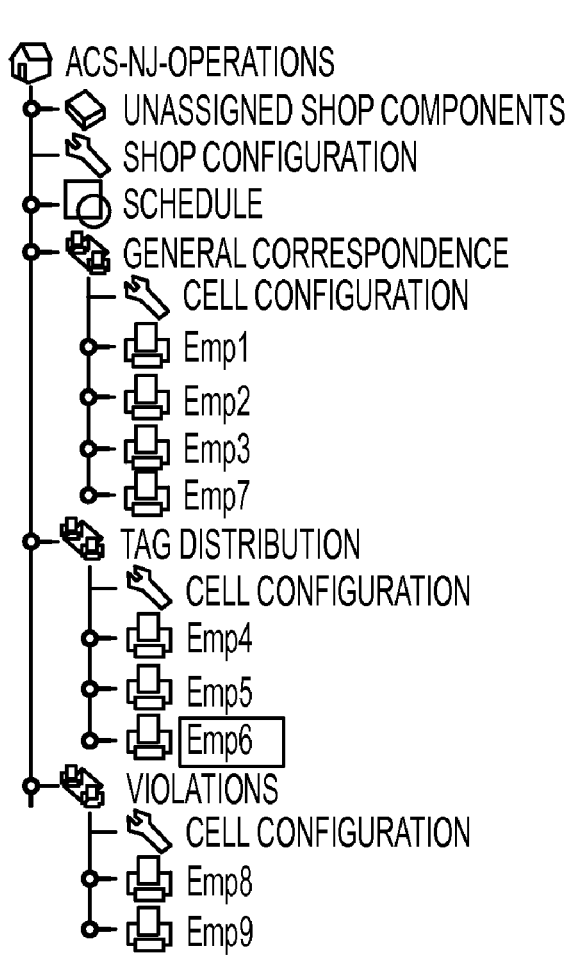
FIG. 9 illustrates an algorithm for simulated annealing to explore the potential resource allocation plan, in accordance with the disclosed embodiments.
FIG. 10 illustrates a pictorial view of a GUI offering a reallocation of the initial resource allocation plan depicted in FIG. 7, in accordance with the disclosed embodiments.

Note that the GUI 500 shown in FIG. 7 and the GUI 800 shown in FIG. 10 are generally shown in a "tree" arrangement wherein individual features can be selected. The GUI 500 and the GUI 800 can be implemented via a GUI such as, for example, the GUI 253 depicted in FIG. 4 herein, and may be provided by a module, such as, for example, module 252 (e.g., a software application) shown in FIG. 4. Additionally, it can be appreciated that GUI 500 and GUI 800 can be displayed via a display device such as display 206 depicted in FIG. 3.

In the illustrated figures herein, the GUI 500 and 800 are generally implemented in the context of a GUI "window". Note that in computing, a GUI "window" is generally a visual area containing some type of user interface. Such a "window" usually (but not always) possesses a rectangular shape, and displays the output of and may allow input to one or more processes. Such windows are primarily associated with graphical displays, where they can be manipulated with a mouse cursor, such as, for example, the input device 230 depicted in FIG. 3.

In general, resources can be allocated to a business process based on the initial resource allocation plan with assistance of a process owner. The process owner distributes nine employees equally among the three departments, as shown in FIG. 7.

Figure 8:
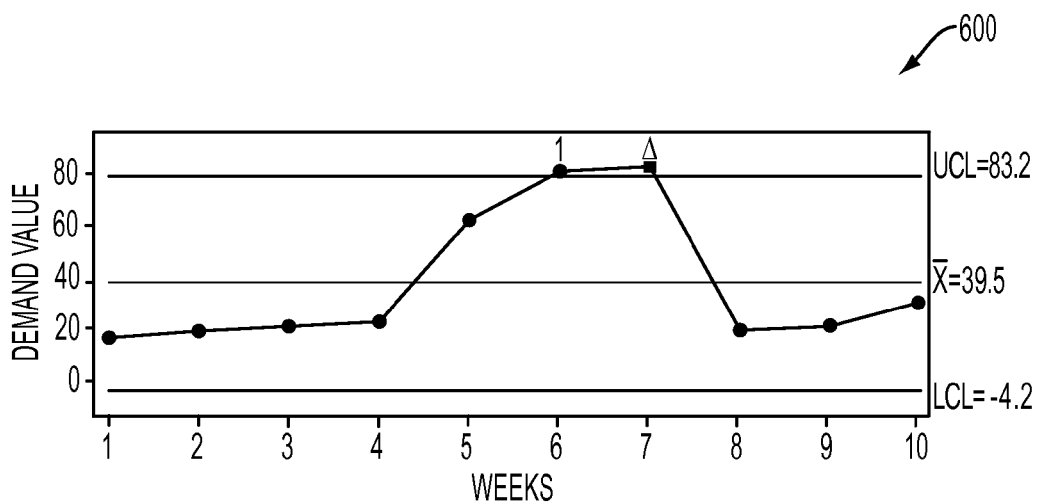
FIG. 8 illustrates a graphical representation of a statistical process chart (SPC) to detect changes in the demand pattern, in accordance with the disclosed embodiments.

FIG. 8 illustrates a graph 600 plotting statistical data indicative of a statistical process (e.g., a statistical process chart 340) to detect changes in the demand pattern, in accordance with the disclosed embodiments. The current demand pattern can be continuously monitored to detect subtle shifts in the demand patterns utilizing the SPC detector 340. A small shift in the current demand can be a pre-cursor to larger changes in the future. When the SPC detector 340 detects a change in demand for one or more departments the message can be presented to the process owner.

In FIG. 8, the data indicates that the SPC detector 340 detects an increase in the demand around week five for a department in the business process. The changes detected by the SPC detector 340 can be presented to the process owner, who can choose to ignore the message based on a false positive and a true shift in the future demand data 360. The process owner can validate the information from the SPC detector 340 and supplies the changed demand profiles as input to the demand data generation unit 350. If the change in the demand pattern is a false positive then the message can be ignored. The information from the statistical process chart can be validated and the changed demand profiles can be supplied as input to the demand data generation unit if a true shift in the demand pattern is detected.

Future demand data 360 can be generated based on the current job data 325 and the outlook of future demand (e.g., see block 440 in FIG. 6). The demand generation unit 350 considers the current job data 325 and the outlook of the future demand data 360 to produce synthetic customer demand data that preserves the characteristics of the historical demand patterns 335 and at the same time adjusting for expected changes in the market conditions. A best resource allocation plan with respect to changed demand profile can be determined and executed utilizing the optimization engine 370 (e.g., see block 450 of FIG. 6). A simulation for each new plan returned by the heuristic explorer 380 can be performed and cost of plan can be determined (e.g., see block 460 of FIG. 6). A recommendation to dynamically reallocate resources can be provided to the process owner (e.g., see block 470 of FIG. 6).

FIG. 9 illustrates an algorithm 700 that can be implemented to allow simulated annealing and the exploration of a potential resource allocation plan, in accordance with the disclosed embodiments. Note that the algorithm 700 can be implemented by for example, the module 252 shown in FIG. 4 and processed via a processor such as, for example, the processor 201 shown in FIG. 1. The simulated annealing algorithm 700 is an optimization technique that avoids entrapment in sub-optimality by allowing for the occasional uphill move. The uphill move can be controlled by a temperature parameter. At high temperature values, the algorithm 700 is more exploratory and avoids falling into a sub-optimal state. As the temperature reduces, however, the operations of algorithm 700 converge toward a solution that is near-optimal.

FIG. 10 illustrates a GUI 800 illustrating a reallocation of initial resource allocation plan, in accordance with the disclosed embodiments. The GUI 800 is graphically displayed in a tree format, wherein particular features such as "Shop configuration," "Schedule," "General Correspondence" and so forth can be selected by a user via a user input device such as, for example, the input device 205 and/or the keyboard 204 shown in FIG. 3.

In general, the heuristic explorer 380 explores a new resource allocation plans and converges to the "best" possible plan based on the simulated annealing process. The goodness of a plan (cost) is based on the cost returned by discrete event simulator 390. The discrete event simulator 390 performs a simulation for each new plan returned by the heuristic explorer 380 and determines the cost of the plan. A random neighbor plan P' of a base plan P refers to a plan P' obtained by modifying the department allocation of a single randomly chosen employee in P. An example neighboring plan for the plan depicted in FIG. 7 is shown via the GUI 800 and the tree configuration of FIG. 10. In such an example, an employee can be randomly selected and moved from violations to the general correspondence department as shown in FIG. 10.

Figure 11:
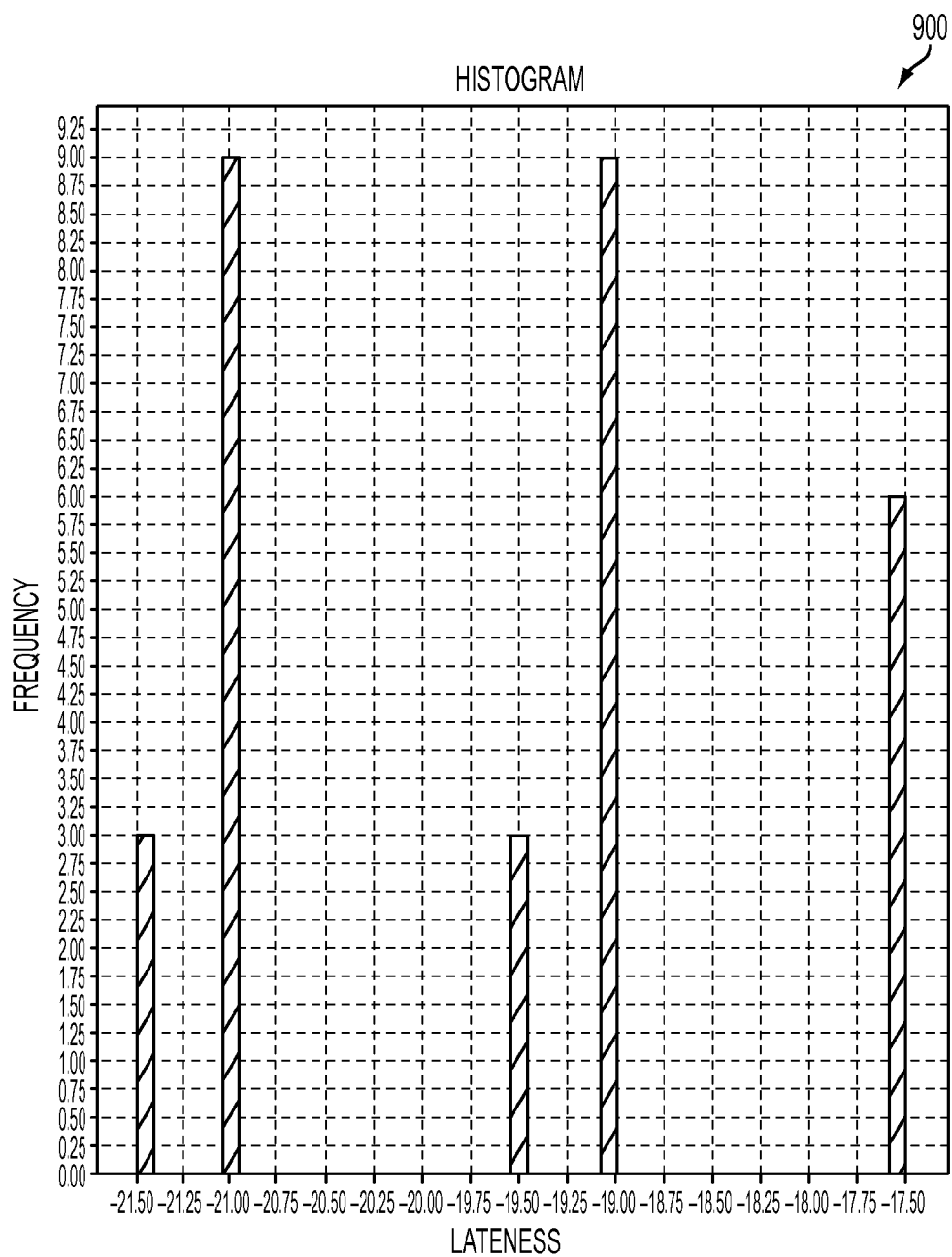
FIG. 11 illustrates a graph depicting data indicative of a late job during a first week operation of a process, in accordance with an exemplary embodiment.

FIG. 11 illustrates a graph 900 that plots data indicative of a "late" job during the first week operation of an example process, in accordance with an exemplary embodiment. In first week, all the employees are equally employed with zero late jobs and the average TAT (Turnaround Time) or cycle time may, for example, 4.4 hours as shown in graph 900 of FIG. 11. The turnaround time can be the total time taken between the submission of a program for execution and the return of the complete output to the customer. The turnaround time can be considered as the initial period when the future demand data 360 can be as expected and the cells are optimally designed for the quantity of demand. The negative values of hours on the X-axis indicate that the number of hours of lateness is zero as illustrated in graph 900 of FIG. 11.

Figure 12:
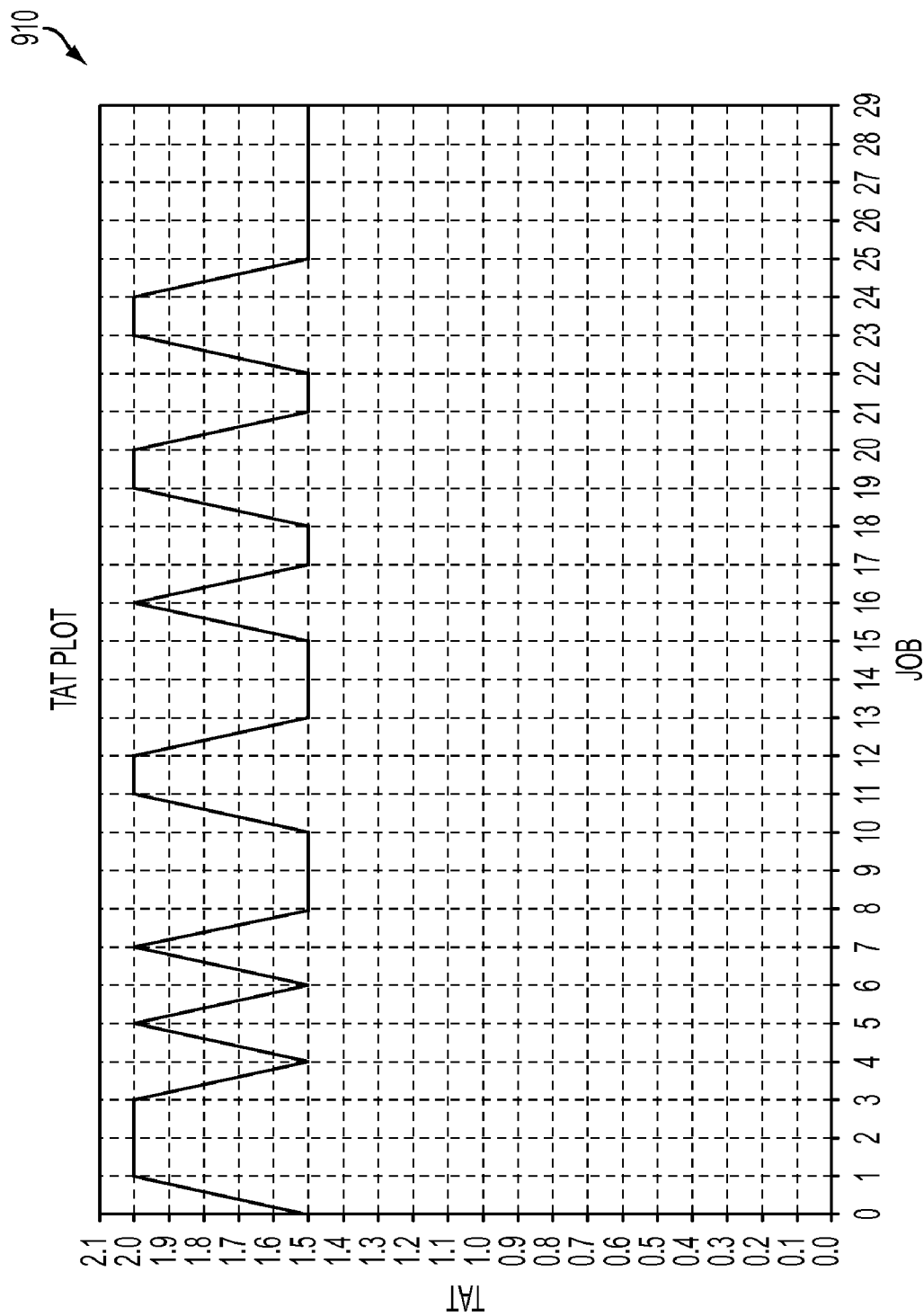
FIG. 12 illustrates a graphic depicting data indicative of the turnaround time during the first week of operation, in accordance with an exemplary embodiment.

FIG. 12 illustrates a graph 910 depicting data indicative of the turnaround time during the first week of operation, in accordance with an exemplary embodiment. In the particular scenario shown in FIG. 12, the turnaround time during the first week period remains fairly stable with an average value of 1.7 hours.

Figure 13:
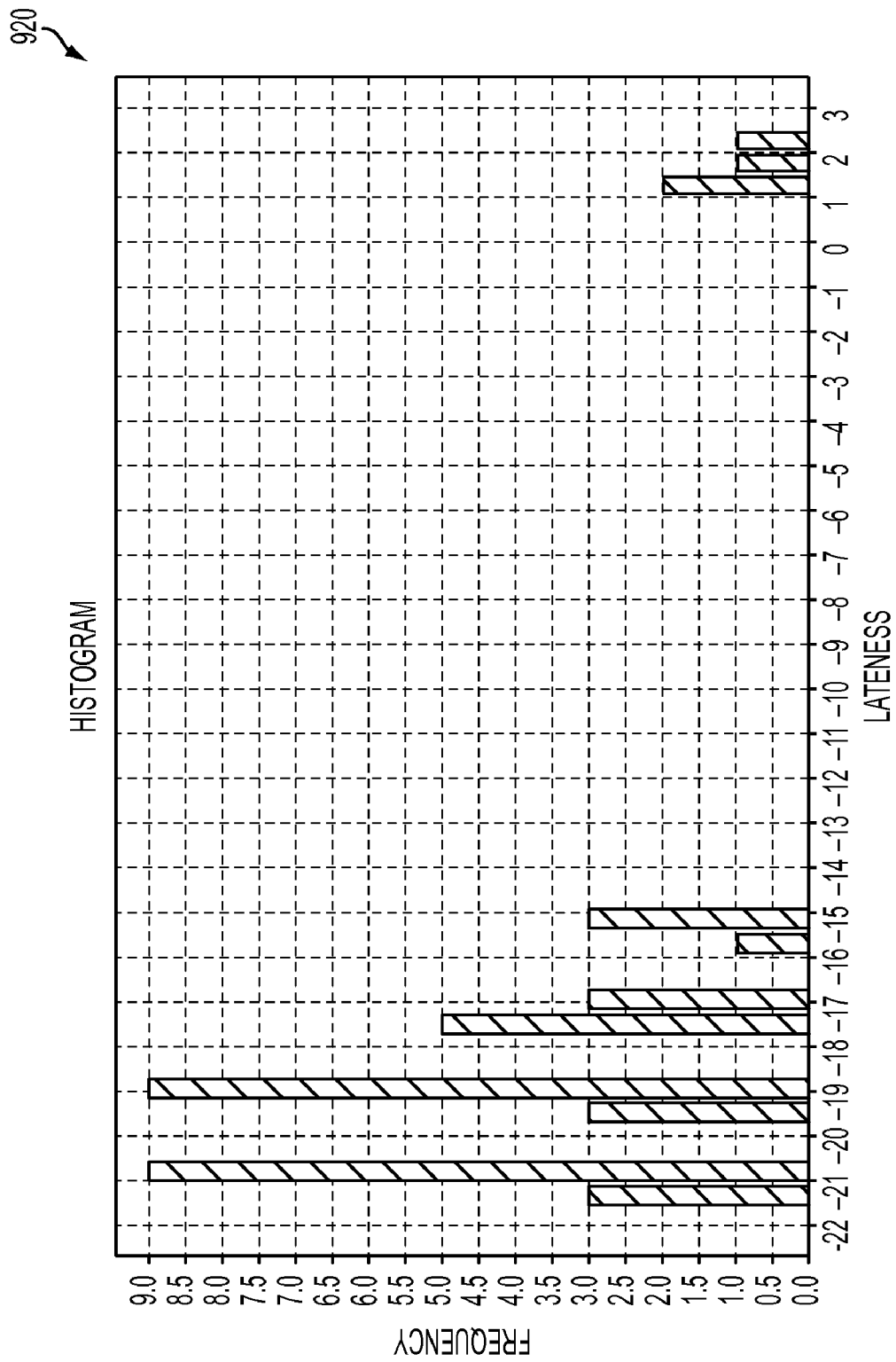
FIG. 13 illustrates a graphic depicting data indicative of a late job during the second week of operation, in accordance with an exemplary embodiment

FIG. 13 illustrates a graph 920 that includes data indicative a late job during the second week of operation, in accordance with an exemplary embodiment. Because of change in the demand pattern, the general correspondence department received more jobs and the violations cell in the second week. Due to change in the demand pattern the operators are not reallocated and the process became sub-optimal.

Figure 14:
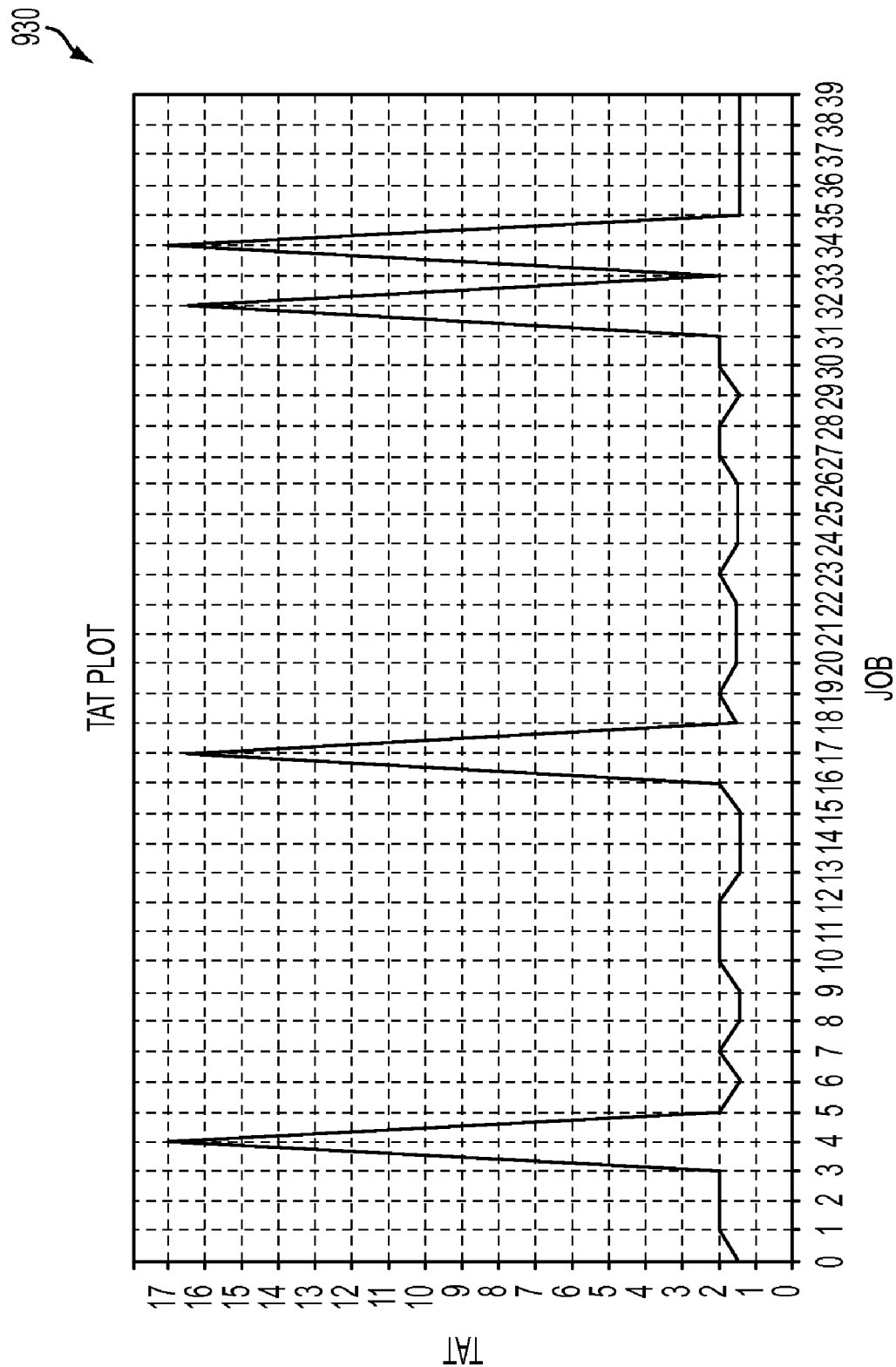
FIG. 14 illustrates a graphic depicting data indicative of the turnaround time of job during the second week of operation, in accordance with an exemplary embodiment.

FIG. 14 illustrates a graph 930 depicting data indicative of the turnaround time during the second week of operation of a process, in accordance with an exemplary embodiment. Because of the buildup in the WIP (Work In Progress), several jobs can possess high turnaround times as indicated by the data plotted in graph 930 of FIG. 14. The turnaround time during the second week period changes with respect to an average value of hours. Thus, the process is now in a sub-optimal state and there is a potential to reallocate operators from one department to another.

Figure 15:
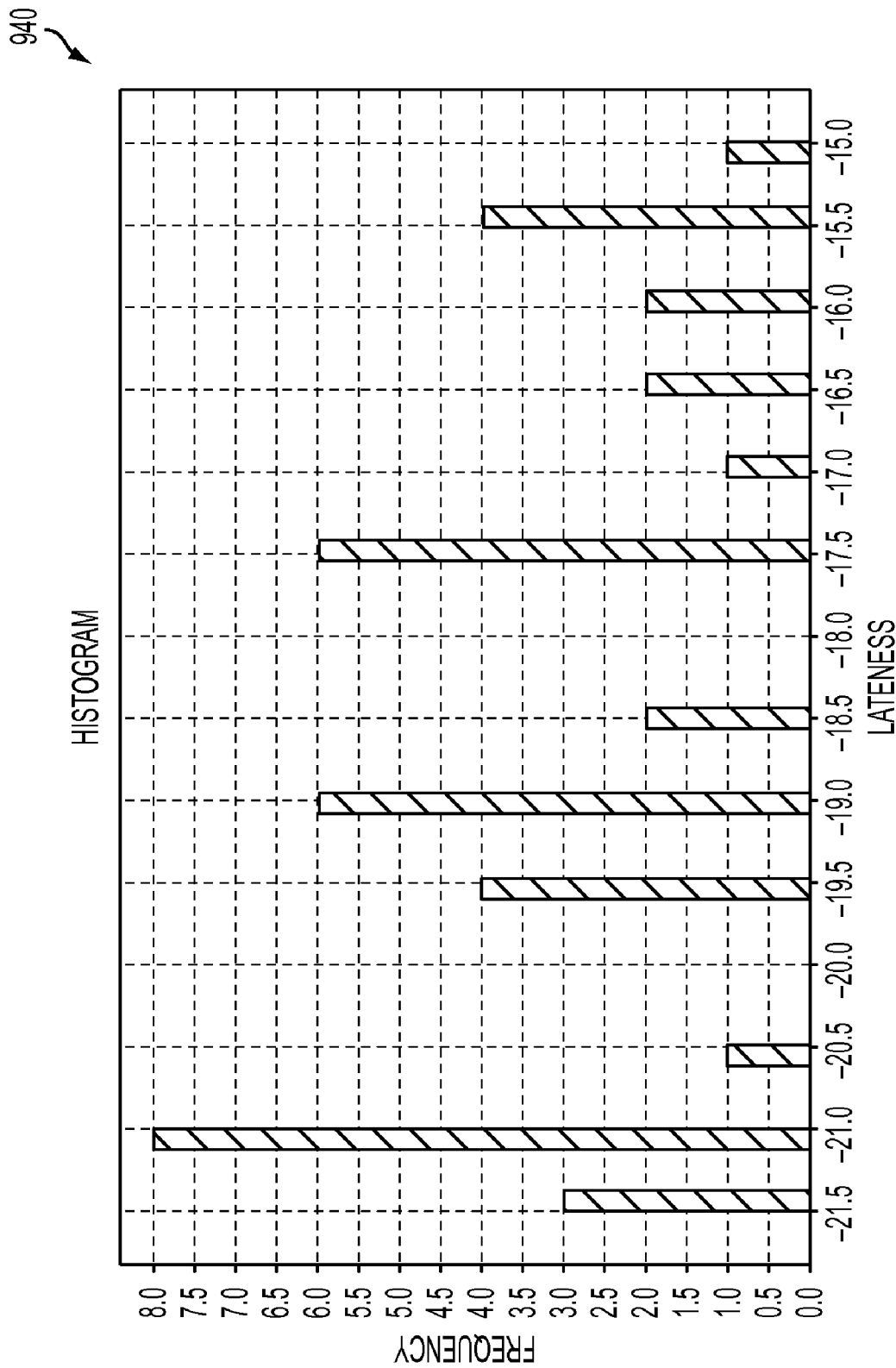
FIG. 15 illustrates a graphic depicting data indicative of a late job during the second week of operation (e.g., dynamic cell configuration), in accordance with an exemplary embodiment.

FIG. 15 illustrates a graph 940 depicting data indicative of a late job during the second week of operation (e.g., dynamic cell configuration) of an exemplary process, in accordance with the disclosed embodiments. The demand predicted for a second week can be increased for a general correspondence cell but maybe relatively lower in the violations cell. The scheduler monitors for example, the demand, the utilization of employees, and present TAT, SLA requirements, the number of cross-trained employees while simulating different scenarios that move employees from other cells to the general correspondence cell to satisfy the high demand.

Figure 16:
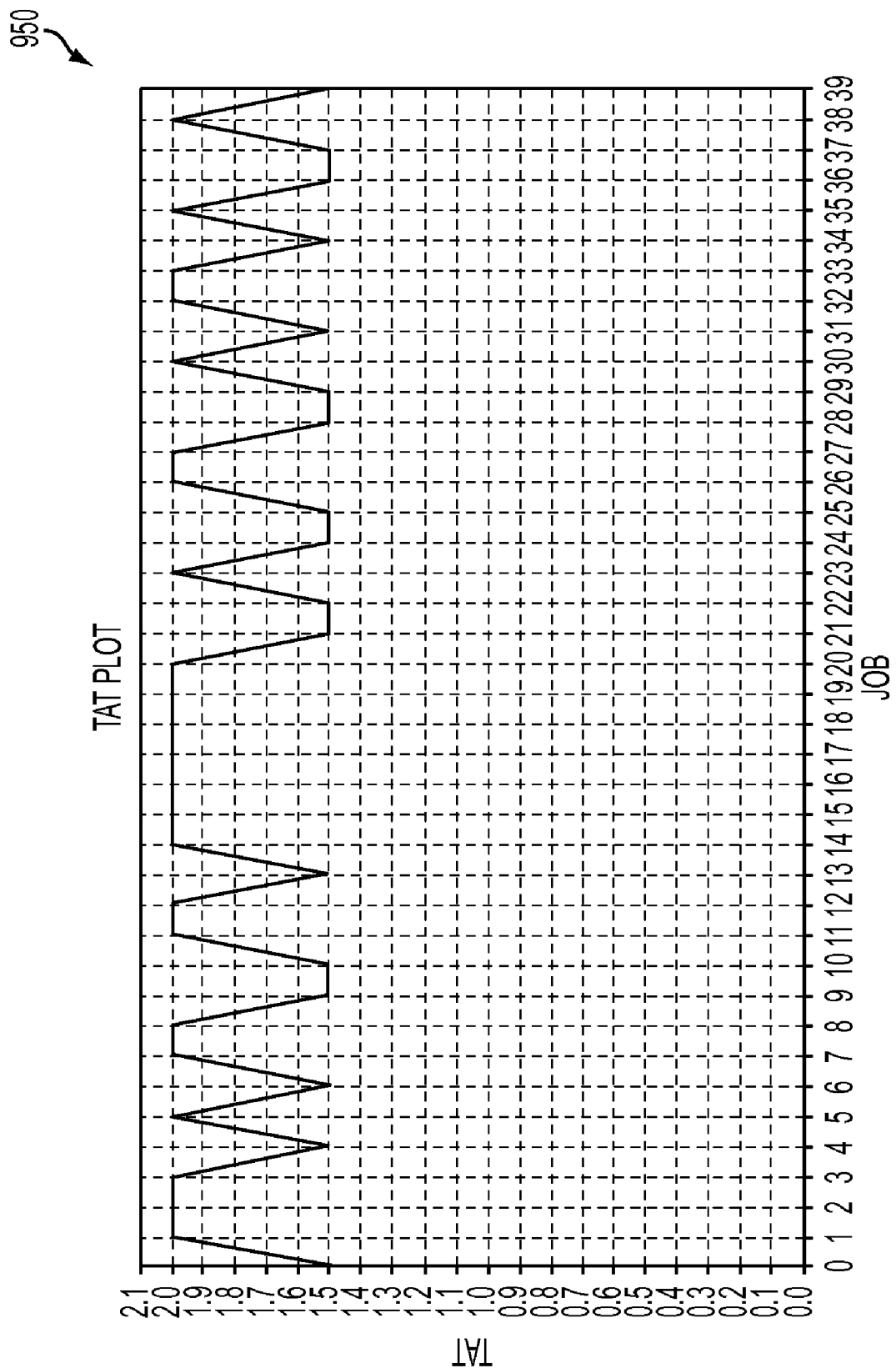
FIG. 16 illustrates a graph depicting data indicative of the turnaround time during the second week of operation (e.g., dynamic cell configuration), in accordance with an exemplary embodiment.

FIG. 16 illustrates a graph 950 that includes data indicative of the turnaround time during the second week of operation (dynamic cell configuration), in accordance with an exemplary embodiment. The reallocation can be done automatically by triggering the analysis based on certain metrics. Realizing that the employees in violation cell are under-utilized, the scheduler can decide to route one person from violations cell to general correspondence cell. Due to resource allocation there are zero late jobs and average turn-around time can be lesser than 10.8 hours. Such type of analysis can be repeated at the end of week based on next week's demand and collecting actual processing times and other information from the process.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for dynamically allocating resources in a process, said system comprising:
   a processor;

a data bus coupled to said processor; and
a computer-usable medium embodying computer code, said computer-usable medium being coupled to said data bus, said computer program code comprising instructions executable by said processor and configured as:
an initial resource allocation unit configured to generate an initial resource allocation plan based on a past experience with respect to a process to allow a process owner to bootstrap said process based on said initial resource allocation plan;
a change detection unit configured to detect a shift in a job demand pattern utilizing statistical process data when a change occurs with respect to a particular requirement;
a future demand generation unit configured to generate future demand data based on current job data and an outlook of a future demand thereof; and
an optimization engine configured to dynamically allocate resources in said process.

2. The system of claim 1 further comprising an optimization engine that acts as a surrogate process expert and provides a recommendation to said process owner regarding a potential resource allocation for new job demand data utilizing a simulation process to predict a result of different staffing configuration and thereby dynamically allocate said resources in said process.

3. The system of claim 1 wherein said change detection unit provides a message to said process owner upon a detection of a change in said job demand pattern.

4. The system of claim 1 wherein said optimization engine further comprises:
a heuristics explorer that analyzes and returns new resource allocation plans for convergence with said potential resource allocation based on a simulated annealing process; and
an discrete event simulator that performs a simulation for each new resource allocation plan returned by said heuristic explorer and determines a cost of new resource allocation plan, wherein said discrete event simulator is a label distribution protocol (LDP) discrete event simulator.

5. The system of claim 1 wherein said optimization engine constantly adjusts said resource allocation and assists in maintaining said process in a state of peak performance.

6. The system of claim 3 wherein said message is ignored if said change in said demand pattern is a false positive.

7. The system of claim 1 wherein information from said statistical process data is validated and said changed demand profile supplied as input to said demand data generation unit if a true shift in said demand pattern is detected.

8. The system of claim 1 further comprising a set of synthetic customer demand data that preserves characteristics of said historical demand pattern and adjusts an expected change in a market condition by said demand generation unit upon considering said current job data and an outlook of said future demand.

9. The system of claim 2 wherein said optimization engine frequently and automatically providing a recommendation whether or not to dynamically reallocate said resource to said process owner.

10. A computer-implemented method for dynamically allocating resources in a process, said method comprising:
generating an initial resource allocation plan via an initial resource allocation unit based on a past experience with respect to a process to allow a process owner to bootstrap said process based on said initial resource allocation plan;
detecting a shift in a job demand pattern via a change detection unit utilizing statistical process data when a change occurs with respect to a particular requirement; and
accurately generating future demand data via a future demand generation unit based on current job data and an outlook of a future demand thereof in order to dynamically allocate resources in said process.

11. The method of claim 10 further comprising utilizing an optimization engine as a surrogate process expert to provide a recommendation to said process owner regarding a potential resource allocation for new job demand data based on a simulation process in order to predict a result of different staffing configuration and thereby dynamically allocate said resources in said process.

12. The method of claim 10 further comprising providing via said change detection unit, a message to said process owner upon a detection of a change in said job demand pattern.

13. The method of claim 10 further comprising configuring said optimization engine to comprise:
a heuristics explorer that analyzes and returns new resource allocation plans for convergence with said potential resource allocation based on a simulated annealing process; and
an discrete event simulator that performs a simulation for each new resource allocation plan returned by said heuristic explorer and determines a cost of new resource allocation plan, wherein said discrete event simulator is a label distribution protocol (LDP) discrete event simulator.

14. The method of claim 10 further comprising configuring said optimization engine to constantly adjust said resource allocation and assist in maintaining said process in a state of peak performance.

15. The method of claim 12 further comprising ignoring said message if said change in said demand pattern is a false positive.

16. The method of claim 10 further comprising validating information from said statistical process data and supplying said changed demand profile as input to said demand data generation unit if a true shift in said demand pattern is detected.

17. The method of claim 10 further comprising providing a set of synthetic customer demand data that preserves characteristics of said historical demand pattern and adjusts an expected change in a market condition by said demand generation unit upon considering said current job data and an outlook of said future demand.

18. The method of claim 11 further comprising frequently and automatically providing a recommendation whether or not to dynamically reallocate said resource to said process owner via said optimization engine.

19. A non-transitory processor-readable medium storing code representing instructions to cause a processor to perform a process, the code comprising code to:
generate an initial resource allocation plan via an initial resource allocation unit based on a past experience with respect to a process to allow a process owner to bootstrap said process based on said initial resource allocation plan;
detect a shift in a job demand pattern via a change detection unit utilizing statistical process data when a change occurs with respect to a particular requirement; and
accurately generate future demand data via a future demand generation unit based on current job data and an outlook of a future demand thereof in order to dynamically allocate resources in said process.

20. The non-transitory process-readable medium of claim 19 wherein said code is further configured to utilizing an optimization engine as a surrogate process expert to provide a recommendation to said process owner regarding a potential resource allocation for new job demand data based on a simulation process in order to predict a result of different staffing configuration and thereby dynamically allocate said resources in said process.

* * * * *